United States Patent [19]

Lee et al.

[11] Patent Number: 5,594,714
[45] Date of Patent: Jan. 14, 1997

[54] FOCUS ERROR DETECTION WITH TWO SYMMETRICALLY SPLITTED REFLECTED BEAMS

[75] Inventors: Chul-woo Lee; Kyung-hwa Rim; Pyong-yong Seong, all of Seoul; Chong-sam Chung, Sungnam, all of Rep. of Korea

[73] Assignee: Samsung Electronics Co., Ltd., Suwon, Rep. of Korea

[21] Appl. No.: 366,255

[22] Filed: Dec. 29, 1994

[30]     Foreign Application Priority Data

Jun. 30, 1994 [KR] Rep. of Korea .................. 94-15695

[51] Int. Cl.⁶ ........................................... G11B 7/00
[52] U.S. Cl. ...................... 369/118; 369/44.23; 369/120
[58] Field of Search ............................ 369/118, 109, 369/112, 44.11, 44.23, 44.21, 44.41, 44.37, 120

[56]           References Cited

U.S. PATENT DOCUMENTS

| | | | |
|---|---|---|---|
| 4,841,508 | 6/1989 | Kimura | 369/44.23 |
| 4,970,710 | 11/1990 | Lee | 369/44.11 |
| 4,973,836 | 11/1990 | Matsuoka | 369/44.23 |
| 5,161,139 | 11/1992 | Inoue et al. | 369/44.23 |
| 5,465,247 | 11/1995 | Kobayashi | 369/109 |

*Primary Examiner*—Nabil Hindi
*Assistant Examiner*—Kim-Kwok Chu
*Attorney, Agent, or Firm*—Dvorak and Traub

[57]              ABSTRACT

In an optical pickup, a focus error detector for detecting a focus error of an objective lens for an optical disk includes a focusing lens for focusing the reflected light of the optical disk, a diffraction optical device for diffracting the reflected light focused by the focusing lens into two light rays, two bi-segmented photo-detectors for receiving the two split light rays, respectively, and a circuit for outputting a desired focus error signal from the signal detected from the photo-detectors. The circuit outputs a pure focus error signal without errors created by the deviation of the light amount in the photo-detectors due to the tilt or shift of the reflected light, thereby contributing to the stable operation and miniaturization of the optical pickup.

7 Claims, 7 Drawing Sheets

FOCUS ERROR DETECTION WITH TWO SYMMETRICALLY SPLITTED REFLECTED BEAMS

BACKGROUND OF THE INVENTION

The present invention relates to a focus error detector which is mainly adopted for an optical pickup for recording and reproducing information by scanning a recording medium and which detects a signal representing the degree of a focus error of an objective lens with respect to the recording medium.

In an optical recording and reproducing pickup, the optical structure of an optical pickup adopting an improved focus error detector in the prior art is shown in FIG. 1.

The light radiated from a laser diode 1 used as a light source is collimated by means of a collimating lens 2 and then passes through a beam splitter 3 to then be incident to an objective lens 4. Thereafter, the light is focused onto an optical disk 5 by objective lens 4. After the reflected light 6 from optical disk 5 is collimated again via objective lens 4, the light travels toward beam splitter 3 to then be focused by a focusing lens 7. The reflected light focused by focusing lens 7 is split into first and second reflected light rays 6a and 6b by means of another beam splitting member 8. The first and second reflected light rays 6a and 6b are focused onto focal points Fa and Fb of focusing lens 7, respectively, and are received by two bi-segmented photo-detectors 9 and 10 each arranged in front and rear portions of the focal points Fa and Fb. The two bi-segmented photo-detectors 9 and 10 are positioned so that their dividing boundaries are slightly askew from each optical axis. Meanwhile, two differential amplifiers 11 and 12 and an summing amplifier 13 perform an operation with respect to the signals from two bi-segmented photo-detectors 9 and 10 to then supply a signal indicating the degree of the focus error corresponding to a relative distance of objective lens 4 with respect to optical disk 5.

In the aforementioned conventional focus error detector, when optical disk 5 is positioned on a focal plane of objective lens 4, the reflected light 6 incident to focusing lens 7, which is collimated, is focused to each given position of focal points Fa and Fb of focusing lens 7. Therefore, at this time, as shown in FIG. 3A, spots having the same size are formed on two bi-segmented photo-detectors 9 and 10. Here, since the photo-detectors 9 and 10 are deviated from each optical axis, differential amplifiers 11 and 12 for differentiating both split sections outputs signals having opposite polarities and but having the same absolute value. Therefore, the output of summing amplifier 13 is zero. When the aforementioned optical disk B is deviated from the focal plane of objective lens 4, the reflected light 6 incident to focusing lens 7 is diverged or converged to then be focused somewhere other than at focal points Fa and Fb of focusing lens 7. Then, the spots of first and second reflected light rays 6a and 6b respectively formed on photo-detectors 9 and 10 become relatively larger or smaller with respect to each other, as shown in FIGS. 2B and 2C. Therefore, at that time, the finally output focus error signal has a negative (−) or positive (+) value.

On the other hand, in the conventional focus error detector, if the optical axis of the reflected light is tilted or shifted by the optical disk vibration or changes over time, even if the optical disk is positioned on the focal plane of objective lens, the spots on the respective photo-detectors are shifted to generate a deviation in the light amount received by the split sections. Due to such a deviation of the light amount, the final focus error signal is output as a negative (−) or positive (+) value, that is, not zero. That is to say, the conventional focus error detector undergoes frequent malfunctions by the optical axis tilt due to the optical disk vibration or changes over time. Also, since the angle formed by the two reflected light rays split by the aforementioned beam splitter is 90° and one of the two photo-detectors for receiving the two reflected light rays are positioned outside the focal points of focusing lens, much space is occupied, which make miniaturization difficult.

SUMMARY OF THE INVENTION

Therefore, it is an object of the present invention to provide a focus error detector for detecting the focus error signal of an objective lens purely, irrespective of the generated deviation of the light amount due to the optical disk vibration or changes over time.

Another object of the present invention is to provide a focus error detector for advantageously achieving the miniaturization of an optical system of the pickup occupying a small space.

To accomplish the above object, the present invention provides a focus error detector for detecting the focus error signal of an objective lens for focusing parallel incident light onto an optical disk, comprising:

a focusing lens for focusing the light reflected from the optical disk and passed through the objective lens;

a beam splitting member for splitting the reflected light focused by the focusing lens into two light rays, where the two light rays are positioned with an equal angle formed on the left and right of the optical axis of the reflected light and the total angle thereof is changed depending on the vertical vibration of the optical disk;

two bi-segmented photo-detectors for detecting signals depending the received light amount by receiving the two light rays split by the beam splitting member; and circuit means for producing a focus error signal representing the degree of the focus error from the signal detected from the two bi-segmented photo-detectors.

BRIEF DESCRIPTION OF THE DRAWINGS

The above objects and advantages of the present invention will become more apparent by describing in detail preferred embodiments thereof with reference to the attached drawings in which:

FIGS. 2A to 2C illustrate the principle of detecting a focus error in the conventional focus error detector, in which FIG. 2A is a circuit diagram for the case when an optical disk is positioned on the focal plane of an objective lens, FIG. 2B is a circuit diagram for the case when the optical disk is positioned on the near side of the focal plane of the objective lens and FIG. 2C is a circuit diagram for the case when the optical disk is positioned beyond the focal plane of the objective lens;

DETAILED DESCRIPTION OF THE INVENTION

Figure 1:
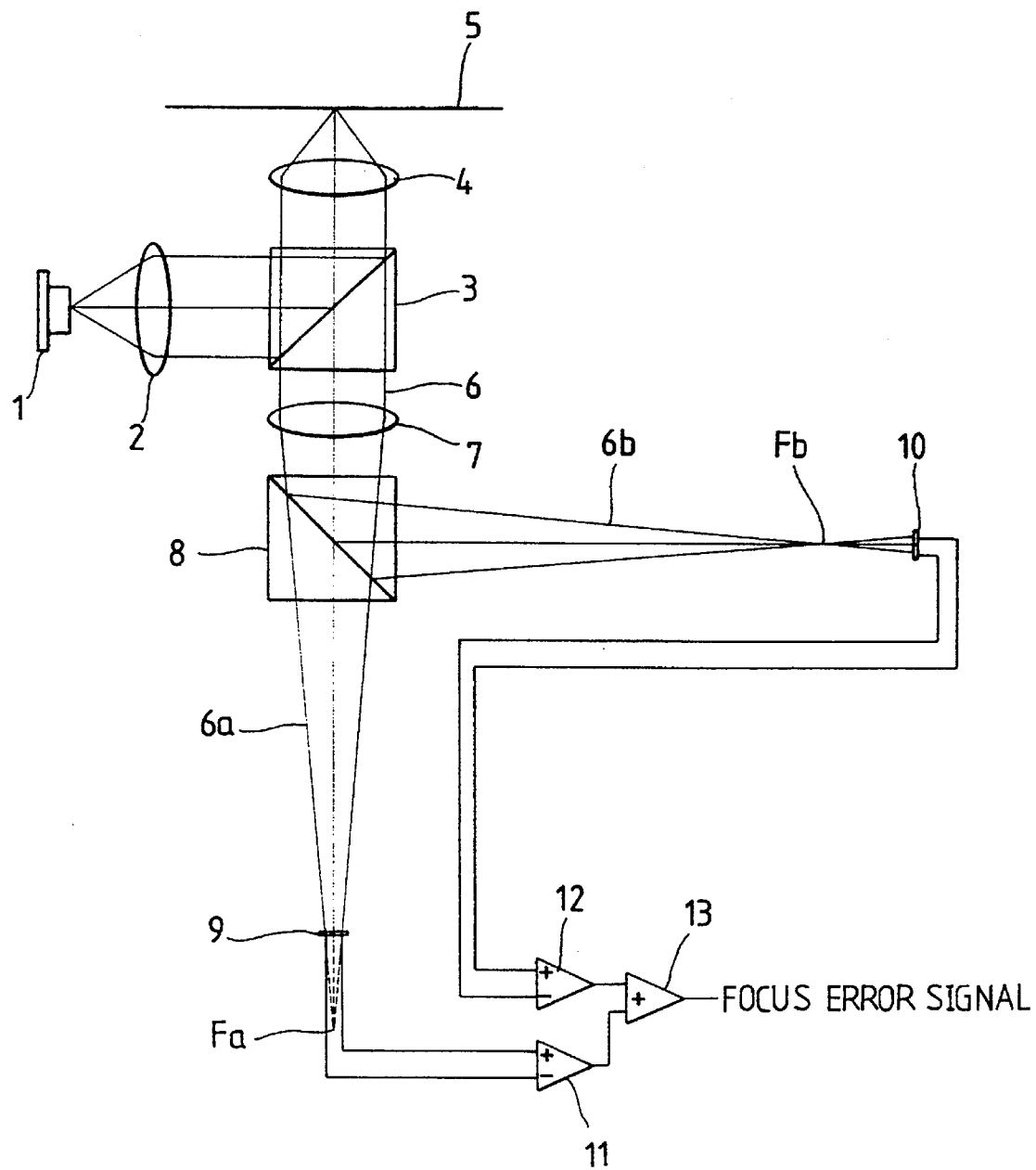
FIG. 1 is a schematic view showing the optical construction of an optical pickup adopting a conventional focus error detector.
Figure 2A:
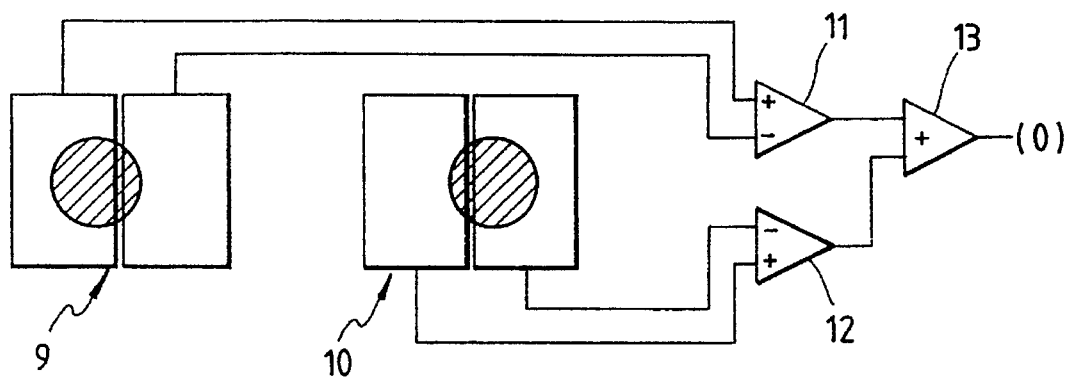
Figure 2B:
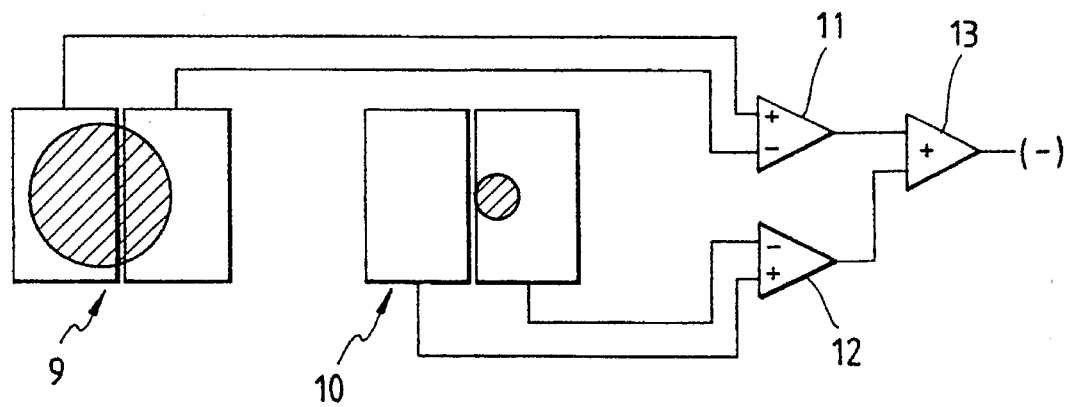
Figure 2C:
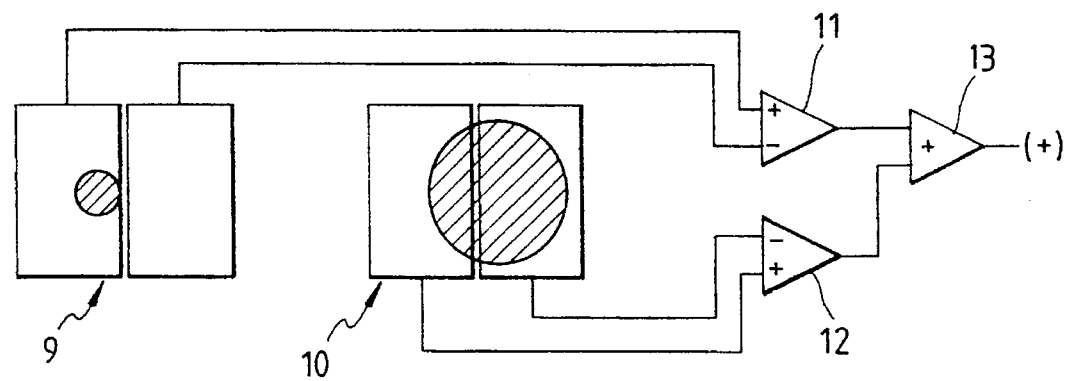
Figure 3:
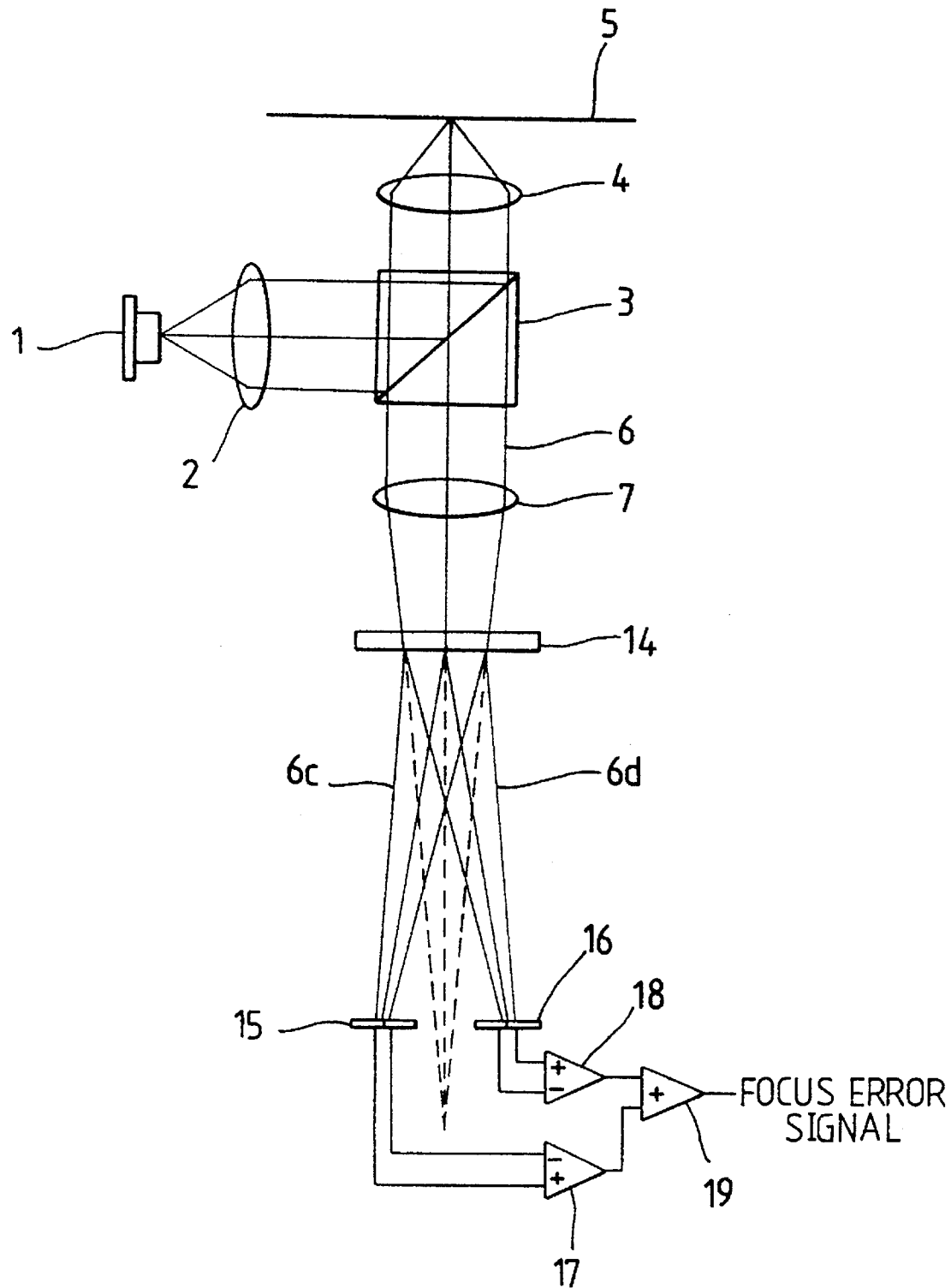
FIG. 3 is a schematic view showing the optical construction of an optical pickup adopting a focus error detector according to an embodiment of the present invention.

In FIG. 3, the optical pickup includes a laser diode 1, a collimating lens 2, a beam splitter 3 and an objective lens 4, as conventionally. The focus error detector according to an embodiment of the present invention provided in the optical pickup is constituted by a focusing lens 7, diffraction optical device 14 like a grating or hologram lens functioning as a beam splitting member, two bi-segmented photo-detectors 15 and 16 and, two differential amplifiers 17 and 18 and a summing amplifier 19 functioning as circuit means. Here, diffraction optical device 14 diffracts the reflected light 6 focused by focusing lens 7 into two light rays 6c and 6d. The two diffracted light rays 6c and 6d, ± first-order diffraction light rays by means of diffraction optical device 14, form equal angles so as to be left-and-right symmetrical with respect to the optical axis of the incident reflected light 6. Bi-segmented photo-detectors 15 and 16 receive the two light rays 6c and 6d and detect electrical signals depending on each received light intensity, respectively. In FIG. 3, the photo-detectors detectors 15 and 16 are positioned on the near side of the respective focal points onto which the two light rays 6c and 6d are focused. However, they may be positioned near or beyond the focal points or may be arranged so as to be eccentrically disposed from each optical axis. Meanwhile, differential amplifiers 17 and 18 and summing amplifier 19 output the focus error signal of objective lens from the signal detected from photo-detectors 15 and 16.

Figure 4:
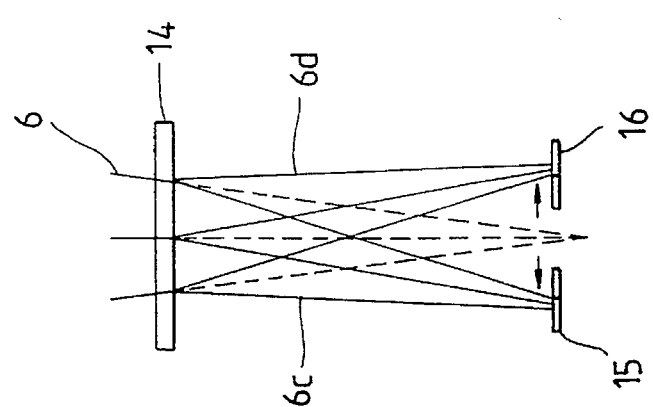
FIG. 4 is a partial schematic view showing the optical profile for the case when the optical disk is positioned on the focal plane of the objective lens in the focus error detector shown in FIG. 3.
Figure 7A:
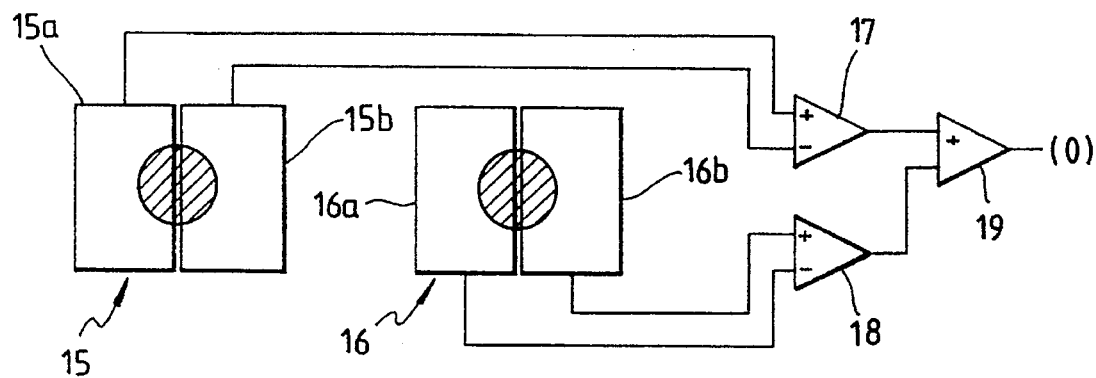
FIGS. 7A to 7C are circuit diagrams illustrating the principle of detecting a focus error in the focus error detector according to an embodiment of the present invention, in which FIG. 7A corresponds to the state shown in FIG. 4, FIG. 7B corresponds to the state shown in FIG. 5 and FIG. 7C corresponds to the state shown in FIG. 6.

FIG. 4 illustrates the case when optical disk is positioned on the focal plane of objective lens. In this case, each optical axis of the two light rays 6c and 6d coincides with each split line of photo-detectors 15 and 16 and their spots are evenly formed on the respective split sections 15a, 15b, 16a and 16b, as shown in FIG. 7A. Thus, the outputs of differential amplifiers 17 and 18 and summing amplifier 19 are all zero.

In the state as shown in FIG. 4, if the optical axis of the reflected light 6 is tilted or shifted horizontally, the focusing positions of the first and second reflected light rays 6c and 6d are also shifted in the tilt or shift direction to then move the positions of the light spots in photo-detectors 15 and 16 from one section to another section, by which the outputs of differential amplifiers 17 and 18 becomes a value other than zero. However, since the relative distance of the spots in photo-detectors 15 and 16, the outputs of differential amplifiers 17 and 18 have opposite polarity and the same absolute value. Therefore, the final output of summing amplifier 19 becomes zero. That is to say, no error is produced by the optical axis tilt or shift due to the optical disk vibration or changes over time.

Figure 5:
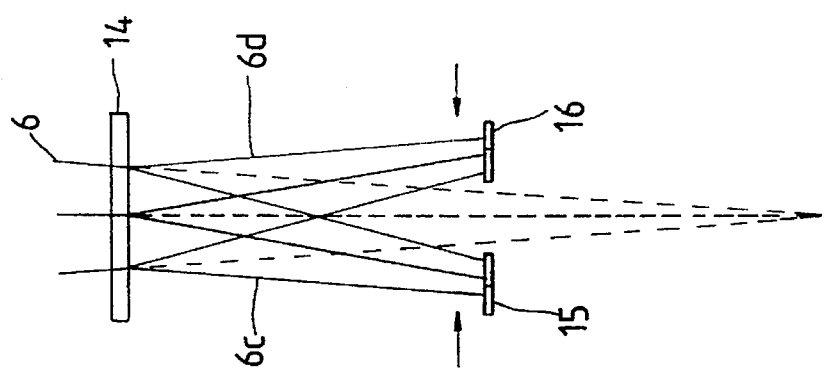
FIG. 5 is a circuit diagram for the case when the optical disk is positioned on the near side of the focal plane of the objective lens in the focus error detector shown in FIG. 3.
Figure 6:
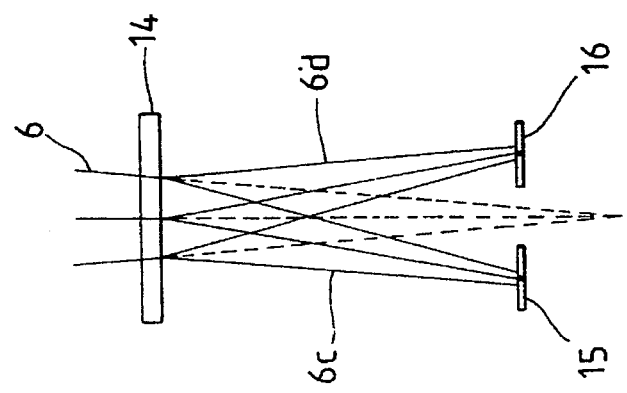
FIG. 6 is a circuit diagram for the case when the optical disk is positioned beyond the focal plane of the objective lens in the focus error detector shown in FIG. 3.

FIGS. 5 and 6 respectively illustrate the cases when optical disk is positioned on the near side and beyond the focal plane of objective lens. In these cases, the reflected light incident to focusing lens is diverged or converged, i.e., not collimated, and the focusing distance becomes longer or shorter than a given focal length.

Figure 7B:
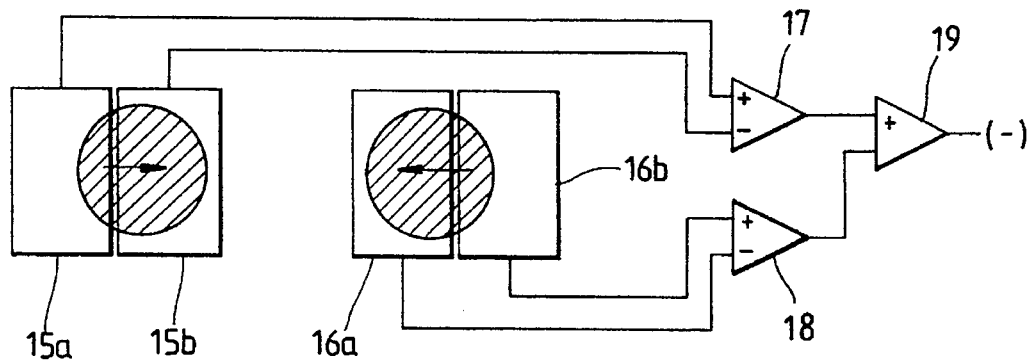
Figure 7C:
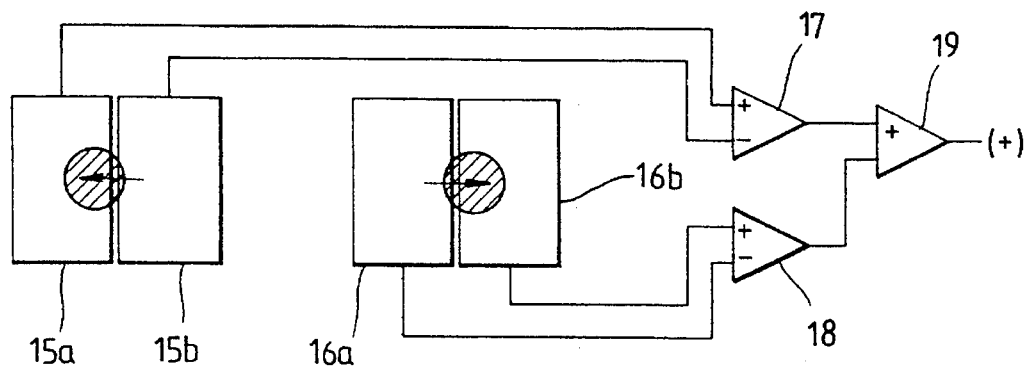

Also, diffraction angles of diffracted light rays other than 0th-order diffraction light vary according to the change of the incident angle of the diverged or converged reflected light with respect to diffraction optical device 14, by which the focusing positions of the two light rays 6c and 6d get closer to or farther from each other. Therefore, as shown in FIGS. 7B and 7C, the diameter of the respective spots formed on photo-detectors 15 and 16 becomes larger or smaller as the case may be and is shifted in the direction where the relative distance decreases or increases. Therefore, the finally output focus error signal becomes a negative (−) or positive (+) value, i.e., not zero.

Figure 8:
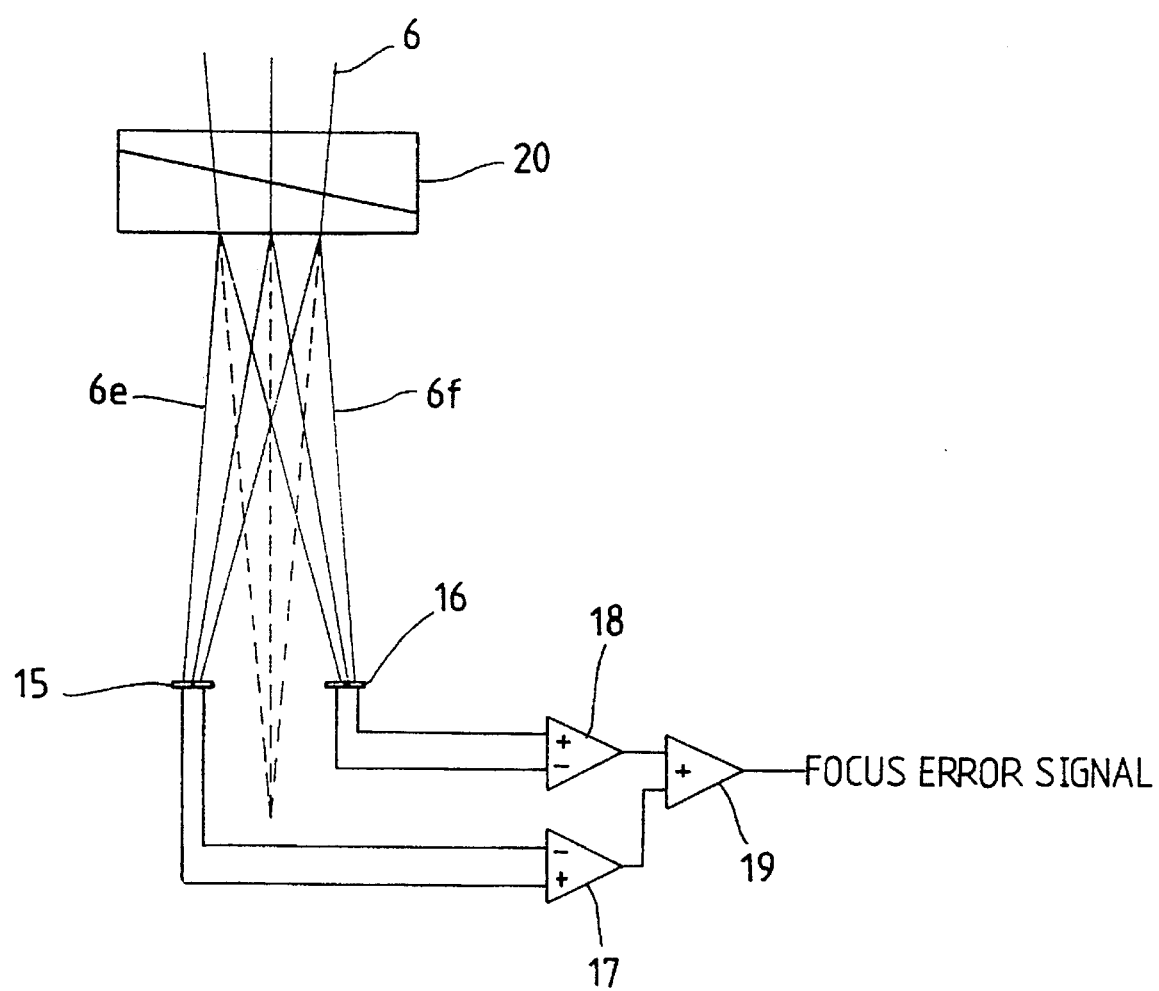
FIG. 8 is a schematic view showing the optical construction of an optical pickup adopting a focus error detector according to another embodiment of the present invention.

Next, FIG. 8 shows the focus error detector according to another embodiment of the present invention. Instead of the diffraction optical device in the aforementioned embodiment, there is provided a composite diffraction device 20 like a Wollaston prism for compositely diffracting the reflected light 6 focused by focusing lens 7 into two light rays 6e and 6f. By applying the two light rays 6e and 6f which are complex-diffracted by composite diffraction device 20 to two bi-segmented photo-detectors 15 and 16 under the same condition, the focus error signal is detected.

Figure 9:
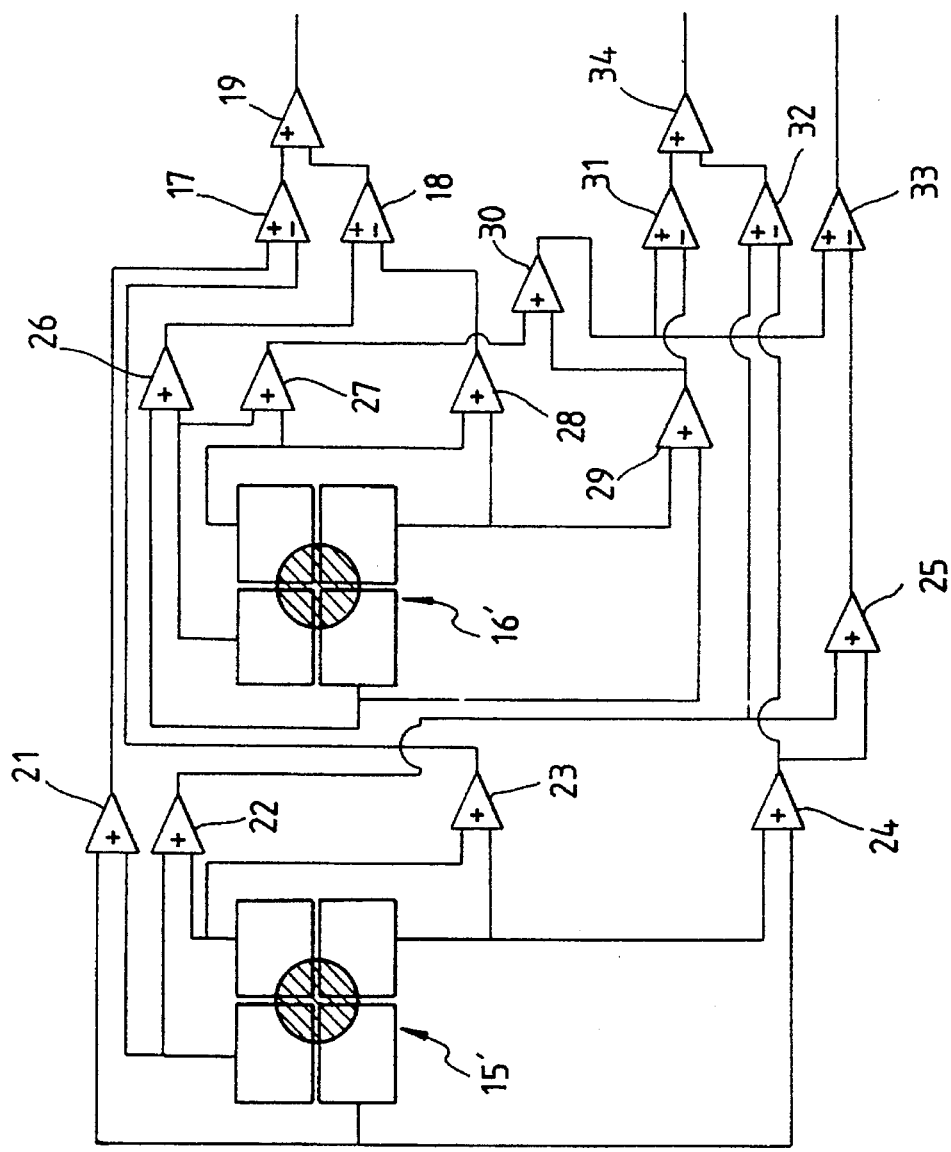
FIG. 9 is a schematic view showing the circuit for detecting a focus error signal, a track error signal and a reproduction signal in the focus error detector shown in FIGS. 3 and 8.

On the other hand, FIG. 9 shows a circuit having quad-segmented photo-detectors 15' and 16' produced by bisecting each bi-segmented photo-detector along the track traversing axis, for detecting a track error signal of objective lens and a reproduction signal of the data information recorded on an optical disk, as well as the focus error signal of objective lens with respect to the optical disk. For detecting the focus error signal, in addition to such two differential amplifiers 17 and 18 and the summing amplifier 19 as described above, there are further provided four summing amplifiers 21, 23, 26 and 28 for summing the split sections located in the track traversing direction of the respective photo-detectors 15' and 16' and then outputting the signal to be applied to the respective input ports of differential amplifiers 17 and 18.

In detecting the track error signal, five summing amplifiers 22, 24, 27, 29 and 34 and two differential amplifiers 31 and 32 are required. In detecting the reproduction signal, in addition to the aforementioned amplifiers, six summing amplifiers 22, 24, 25, 27, 29 and 30 and one differential amplifier 33 are required.

As described above, according to the present invention, irrespective of the tilt or shift of the reflected light due to the optical disk vibration or changes over time, a pure focus error signal is detected using a diffraction optical device or a composite diffraction device, thereby contributing to the stable operation and miniaturization of the optical pickup.

What is claimed is:

1. A focus error detector for detecting a focus error of an objective lens used for focusing a parallel incident light onto an optical disk, comprising:

a focusing lens for focusing a light having an optical axis, said optical axis defined by a left side and a right side to said axis, said light reflected from said optical disk and passed through said objective lens;

a beam splitting member for splitting the reflected light focused by said focusing lens into two light rays, where said two light rays are positioned at an equal angle with respect to the left side and right side of the optical axis of said reflected light;

two bi-segmented photo-detectors for detecting signals depending the received light intensity by respectively receiving said two light rays split by said beam splitting member; and circuit means for producing a focus error signal representing the degree of said focus error from the signal detected from said two bi-segmented photo-detectors, wherein said reflected light and said two light rays always have the same spot size.

2. A focus error detector as claimed in claim 1, wherein said beam splitting member includes a diffraction optical device for diffracting said reflected light.

3. A focus error detector as claimed in claim 1, wherein said beam splitting member includes a composite diffraction device for compositely diffracting said reflected light.

4. A focus error detector as claimed in claim 1, wherein said two bi-segmented photo-detectors are disposed so as to be positioned near the focal points onto which said two split light rays are focused.

5. A focus error detector as claimed in claim 1, wherein said two bi-segmented photo-detectors are disposed on the near side of the focal points onto which said two split light rays are focused.

6. A focus error detector as claimed in claim 1, wherein said two bi-segmented photo-detectors are disposed so as to be positioned beyond the focal points onto which said two split light rays are focused.

7. A focus error detector for detecting a focus error of an objective lens used for focusing a parallel incident light onto an optical disk, comprising:

a focusing lens for focusing a light having an optical axis, said optical axis defined by right side to said axis, said light reflected from said optical disk and passed through said objective lens;

a diffraction optical device acting as beam splitting member for splitting the reflected light focused by said focusing lens into two first-order diffraction light rays, each of said light rays having a respective focal point, where said two light rays are positioned at an equal angle with respect to the left side and right side of the optical axis of said reflected light;

two bi-segmented photo-detectors for receiving and detecting a respective spot detecting signal that is dependent upon an intensity of light from each of said two light rays; and circuit means for producing a focus error signal representing the degree of said focus error from the signal detected from said two bi-segmented photo-detectors, wherein said reflected light and said two light rays have the same intensity when received by said bi-segmented photo-detectors regardless of a position of said photo-detectors with respect to said focal points of each of said two light rays, such that each of said two light rays always have the same spot size when received by each of said bi-segmented photo-detectors.

* * * * *